Patented Oct. 21, 1941

2,259,664

UNITED STATES PATENT OFFICE 2,259,664

COLD SEALING COMPOSITION AND METHOD FOR PRODUCING THE SAME

Curt Schülein, Bopfingen-Wurttemberg, Germany, assignor to Taccalin Chemical Corporation, Long Island City, N. Y., a corporation of New York No Drawing. Application February 4, 1938, Serial No. 188,786
In Germany December 2, 1937

2 Claims. (Cl. 106—40)

The usual method of affixing seals on money-letters, parcels and documents of most various kinds, using a sealing wax which must be heated to high temperature, is open to many objections. Thus, it is often impossible to avoid that the paper support is scorched or burnt by the hot sealing wax, which sometimes even catches fire, quite apart from the fact that the working with an open flame is in itself objectionable.

It has repeatedly been proposed to employ instead of sealing wax which must be applied hot a substance which does not require heating. The proposals hitherto made, have not given an absolutely satisfactory result. Even when substances were produced which solidify with sufficient rapidity and give a clear impression of the seal, these did not likewise meet the requirement of adhering tightly to the support of paper, cardboard or the like and of at the same time attaining such brittleness that the seals could not be detached from the support without being destroyed.

The invention relates to a cold sealing substance which fulfills all these requirements to a high degree. The sealing substance dries and solidifies sufficiently rapidly, adheres tightly to paper, cardboard and the like, and at the same time possesses such brittleness that, while not being destroyed by any slight mechanical actions, it must break at any attempt to remove the seal from the paper.

The sealing composition according to the invention is composed of the base substances, cellulose ester or cellulose ether, dextrine or casein, formaldehyde and a solvent or swelling medium for the cellulose ester or for the cellulose ether. The quantitative proportions of the individual components is important. The cellulose ester or cellulose ether should and must be the chief component. Dextrine or casein, which are to be used in a condition swelled with water, should be present to an amount of 10 to 30% of the cellulose ester or cellulose ether; formaldehyde, if free from water, in quantities of about 50 to 100% relatively to the dextrine or casein present, and finally the quantities of solvent or swelling medium for the cellulose ester or cellulose ether must be adjusted so that the total mass forms a kind of paste. The quantity of solvent is normally 1 to 3 parts of the cellulose ester or cellulose ether present.

The use of cellulose esters or cellulose ethers and suitable volatile solvents therefor for the preparation of cold esaling composition is in itself not new. The known compositions, however, possess the above mentioned disadvantages, that is they are not sufficiently adhesive and they are not sufficiently brittle. These properties, which are here the determining factors, are produced by the presence of dextrine or casein, and the simultaneous presence of formaldehyde causes the dextrine or casein to pass into the waterproof state, so that the sealing wax, even after hardening, cannot be detached from its support, for example with the aid of water.

It is extremely peculiar, that the effect of the formaldehyde on dextrine or casein only takes place after the evaporation of the solvent, whereas it might be expected that the effect would take place soon after the mixing of the indivdual components, when it is evident that the dextrine or casein present would be converted into the ineffective state before it could exert its action improving the adhesion.

The reason for this is obviously that the solvents or swelling media for the cellulose ester or cellulose ether, several of which may be used together, likewise dissolve the formaldehyde and therefore dilute it to such an extent that its hardening effect on the dextrine or casein cannot take effect.

Another improvement of the cold sealing composition consists in that at the same time small quantities of a phenol aldehyde resin or of an alkyde resin are incorporated at the same time and further a substance improving the plasticity, such as glycerine, castor oil, ethyl phthalate or the like is added. However, the quantity of the above mentioned artificial resins should, if possible, not exceed 30% of the weight of the cellulose ester or cellulose ether which is employed. The additions of softeners must be kept very small.

If desired, finely pulverized or fine fibrous filling substances can then be added to the cold sealing composition, for example, chalk, micro-asbestor, paper fibres. The quantity of these additional substances should, however, likewise not be excessive and should not exceed 50% of the cellulose ester or cellulose ether which is employed.

The above mentioned artificial resins act in such a manner, that they assist in increasing the adhesion caused by dextrine or casein. The added filling substances, the quantity of which can be varied as desired, influence particularly the elasticity or brittleness. The more filling substances are added the greater will be the brittleness of the composition.

As regards the solvents or swelling media to be used for the cellulose ester or cellulose ether there is a wide range to choose from. The only condition is that the solvents are sufficiently volatile not to retard too much the drying or hardening of the cold sealing composition in use. Methylene chloride may be used as solvent but care must then be taken that the finished paste is stored in absolutely tightly closing containers, because in view of the rapidity with which this substance volatilizes, the paste will otherwise harden in the container. A substance placed on the market under the name of "Drawin" has been found particularly suitable as solvent as it does not possess the above mentioned disadvantages of methylene chloride.

For example the procedure may be as follows:

2 parts of dextrine or casein are swelled in water, heat being applied if desired, so that a viscous substance is produced. To this 10 parts of powdered acetyl cellulose, 1.5 parts of micro asbestos and 1.5 parts of chalk in powdered state are added and the mixture is kneaded. The vessel containing the mixture is then air-tightly closed and—whilst the kneading is continued—about 25 parts of the solvent "Drawin" are added gradually, so that a viscous paste is formed. 1.5 parts of para-formaldehyde and finally 2 grams of albertol and 10 drops of glycerine are added to the composition.

The homogenous mixture thus produced is then filled directly into tubes which are air-tightly closed. The composition in the tubes is ready for use.

If desired, colouring substances, preferably mineral colours, or metal powder can be added to the composition to influence the appearance of the seal.

I claim:

1. A cold sealing composition essentially comprising an intimate mixture of a cellulose derivative selected from the group consisting of cellulose esters and cellulose ethers, a volatile solvent for such cellulose derivative in a proportion of one to three times the quantity of the cellulose derivative, a quantity of a material selected from the group consisting of dextrine and casein which is about 10% to 30% of the quantity of the cellulose derivative, said material being at least swollen in water, a quantity of formaldehyde which is 50% to 100% of the weight of the material selected from the group consisting of dextrine and casein and a quantity of filling substances not exceeding 50% of the cellulose derivative.

2. A cold sealing composition essentially comprising an intimate mixture of a cellulose derivative selected from the group consisting of cellulose esters and cellulose ethers, a volatile solvent for such cellulose derivative in a proportion of one to three times the quantity of the cellulose derivative, a quantity of a resin selected from the group consisting of phenolaldehyde resins and alkyd resins not exceeding 30% by weight of the cellulose derivative, a quantity of a material selected from the group consisting of dextrine and casein which is about 10% to 30% of the quantity of the cellulose derivative, said material being at least swollen in water, a quantity of formaldehyde which is 50% to 100% of the weight of the material selected from the group consisting of dextrine and casein and a quantity of filling substances not exceeding 50% of the cellulose derivative.

CURT SCHÜLEIN.